United States Patent [19]

Leigh

[11] 3,923,960
[45] Dec. 2, 1975

[54] COMPOSITIONS CONTAINING DITHIONITES

[76] Inventor: Roland Albert Leigh, 2 Lynwood Drive, Blakedown, Kidderminster, England

[22] Filed: Sept. 10, 1973

[21] Appl. No.: 395,544

[30] Foreign Application Priority Data
Sept. 8, 1972 United Kingdom............... 41846/72

[52] U.S. Cl. ................. 423/265; 423/515; 252/188
[51] Int. Cl............................................. B01d 17/66
[58] Field of Search ........... 423/515, 516, 514, 265; 252/188

[56] References Cited
UNITED STATES PATENTS 2,525,770  10/1950  Cook et al. .......................... 252/188
3,666,409  5/1972  Yoshikawa et al. ................ 423/264

Primary Examiner—Earl C. Thomas
Attorney, Agent, or Firm—Dennison, Dennison, Townshead & Meserole

[57] ABSTRACT

An anhydrous dithionite composition is rendered resistant to ignition by including in it as a stabiliser a carboxylic acid salt of a primary, secondary or tertiary amine having at least one hydrocarbon group of at least five carbon atoms.

22 Claims, No Drawings

COMPOSITIONS CONTAINING DITHIONITES

FIELD OF THE INVENTION

This invention relates to compositions comprising a metallic dithionite, particularly sodium dithionite.

DESCRIPTION OF THE PRIOR ART

Aqueous solutions of dithionite are used extensively in the textile and pulp and paper industries as bleaching agents, as reducing agents for vat dyes and as means of destroying dyes containing azo links. The dithionite is normally stored as a solid until required. Commercially available powdered anhydrous sodium dithionite is stable for long periods in dry air but undergoes decomposition in the presence of water or water vapour. The action of water is initially to form the dihydrate of the dithionite with the liberation of heat. The dihydrate is particularly readily oxidised by atmospheric oxygen, again exothermically. If the heat liberated in these two reactions is not removed rapidly enough a third exothermic reaction may occur, namely, the spontaneous decomposition of the salt with the disengagement of sulphur dioxide and the formation of thiosulphate, bisulphite and sulphur. The heat liberated during these reactions may be so great that the temperature of the decomposing compositions rises above the ignition point of sulphur, so that the composition finally begins to burn. Since dithionites are often used in environments of high humidity this tendency to ignite is a serious problem which has given rise to a number of fires in dye-houses and pulpmills.

It is known to reduce the ignitability of dithionites by admixture of additives, a variety of which have been proposed, as for example in co-pending UK application No. 36875/68 where it is disclosed that a cationic, amphoteric or nonionic surfactant may be used. These previously suggested additives which have generally been water soluble materials vary in their modes of action and degrees of effectiveness. Some merely function as inert diluents to reduce the temperature rise when decomposition occurs. Other materials function in ways which are note entirely understood to inhibit either the initial or the later stages of decomposition. However the amount of stabilizer it is practicable to add is clearly limited, particularly since in many cases the stabilizer itself has a detrimental effect on the process in which the dithionite is to be used. Thus, despite the undoubted effectiveness of many known stabilizers there is at present a need for a commercially available stabilized dithionite composition which is known to be safe against self-ignition under extreme conditions, such as for example where the dithionite is accidentally wetted and then covered with a fresh layer of dry dithionite so that the heat of decomposition builds up inside the body of the material. For this reason it is still customary to package, transport and store sodium dithionite in unit quantities of the order of 50 to 100 kg in spite of the obvious advantages of bulk handling.

West German patent specification OLS No. 1,943,459 discloses that aliphatic amines containing at least one alkyl group of 5 or more carbon atoms may be employed as stabilizers for sodium hydrosulphite (dithionate). It is also stated that quaternary ammonium salts such as octyltrimethylammonium chloride may be used likewise although no other quaternary ammonium salt is mentioned and the only exemplified quaternary ammonium salt is a higher alkyl/trimethylammonium chloride.

Summary

We have now discovered that salts of primary, secondary or tertiary amines with a carboxylic acid are more effective stabilizers of metallic dithionites than are the generality of amines and quaternary ammonium compounds disclosed in the aforesaid German publication. This difference in stabilizing effectiveness may be demonstrated by an improved test method we have devised which simulates extreme conditions tending to cause decomposition of the dithionite against which the generality of previously known stabilizers prove ineffective. This test method is described hereinafter.

Accordingly the present invention provides a stabilized substantially anhydrous dithionite composition comprising a major proportion of a metallic dithionite and as a stabiliser, a carboxylic acid salt of a primary, secondary or tertiary amine, which amine has at least one hydrocarbon group of at least five carbon atoms.

The amine is preferably a primary, secondary or tertiary alkyl amine although aryl-, alkyaryl-, aralkyl- and amines comprising mixed alkyl, aryl, aralkyl and/or aralkyl groups may also be used. Among possible alkyl amines are included primary amines such as amyl amines, cyclohexylaminem 1,3- dimethylbutylamine, hexylamine, 2-aminoheptane, 2-amino-4- methylhexane, 1,4-dimethylpentylamine heptylamine, 2-ethylhexylamine, octylamine, 1-cyclopentyl - 2 -aminopropane, 1,1, 3,3, - tetramethyl-butylamine, decylamine, dodecylamine, tetradecylamine, coc amine, tallow, amine, hydrogenated tallow amine, cetylamine, stearylamine, docosylamine, cottonseed amine, oleylamine, laurylamine, palmitoleylamine, linoleylamine, myristoleylamine, palmitylamine, margarylamine and the like; secondary amines such as diamylamines, didodecylamine, ditetradecylamine, dihexadecylamine, dioctadecylamine, dicoco amine, di-hydrogenated tallow amine, di (octadecenyloctadecadienyl) amine, di (eicosyl-docosyl) amine, dicyclohexylamine, bis (1,3 - dimethylbutyl) amine, bis (2 - ethyhexyl) amine, bis (1 - ethyl - 3-methylpentyl) amine, propylaurylamine, methyloleylamine, methyloctylamine, dioctylamine, distearylamine; and the like; tertiary amines such as triamylamines, dimethyloctylamine, dimethyllaurylamine, dimethylstearylamine, dimethyldocosylamine, trioctylamine, tridodecylamine, tricoco amine, isooctyldicoco amine, trihydrogenated tallow amine, N - methyl - di-hydrogenated tallow amine, N,N,-dimethylhexadecylamine, N,N,-Dimethyloctadecylamine, N,N,-dimethylcoco amine, N,N,-dimethyl (octadecenyl - octadecadienyl) amine, N,N, - dimethyl hydrogenated tallow amine and the like; di amines such as N-octyl ethylenediamine, N-stearylpropylene diamine, N-octadecenyl trimethylenediamine, N-coco-trimethylenediamine, N-tallow-trimethylenediamine, N- (octadecenyl - octadecadienyl) trimethylenediamine. Alkyl propylene diamines such as those sold under the registered Trade Marks "DUOMEENS", and "ARMEENS" may also be used.

The preferred amines are these giving rise to solid, water soluble carboxylate salts, such as coco, lauryl, palmitoleyl and tallow amines since such materials may be advantageous in some applications of dithionites, such as dyeing or stripping operations, in which water insolubility is unacceptable.

The carboxylic acid is preferably an aliphatic acid although aromatic acids such as benzoic and phthalic acids may be employed. Naphthenic, naphthic and acenaphthic acids may also be used. Lower aliphatic carboxylic acids such as formic, acetic, propionic, butyric and pentanoic as well as dibasic acids such as succinic, glutaric and adipic acids and also oleic acid are particularly preferred. Acetic acid is most preferred. Among preferred carboxylate salts for present use are those salts sold under the registered trade mark "ARMAC S" and "DUOMACS".

The aforesaid trademarks are registered by the Armour Industrial Chemical Company. ARMEEN describes high molecular weight aliphatic amines including primary, secondary and tertiary amines. ARMAC identifies the acetic acid salts of the aforesaid fatty amines. DUOMENE describes N-higher alkyl-trimethylene diamines, and DUOMAC correspondingly describes the acetic salts of the DUOMENE.

The quantity of stabilizer employed in the novel compositions depends upon its effectiveness and upon the required lifetime and storage conditions of the composition. The stability of the novel compositions, although in general greater than that of previously known dithionite compositions, may vary within wide limits so that in some cases a stabilised composition might contain, say, as little as 0.02% (by weight) of the stabiliser. In other cases it might be found desirable to employ up to 5% or in extreme cases, 10% on the same basis; concentrations of from 0.2, more often 0.5% to 3%, especially 1% to 2% are suitable in the main. The effectiveness of any given stabiliser may readily be tested by a standard method involving the addition of water to the surface of a quantity of stabilised dithionite followed by the superposition of a further quantity of the stabilised dithionite onto the wetted surface and observation of the ensuing temperature rise. Such a method is novel and constitutes a further aspect of the invention. One embodiment of such a method is described in the examples given hereinafter.

The stabilisers of the present invention are solid in most cases and may therefore be easily mixed with a dithionite by known methods, mixing being as intimate as possible. In a few cases the stabilisers are soft or sticky low melting solids in which case they may be mixed with the dithionite dissolved in an organic solvent, e.g. isopropanol, which may subsequently be evaporated or distilled off. Alternatively the stabiliser may be mixed into the dithionite as a melt. On the other hand the stabiliser may be incorporated into the dithionite during the last stages of dithionite manufacture instead of into the already manufactured dithionite. For example, an alcohol-wet filter cake of a dithionite may be mixed with an alcoholic solution of the stabiliser before drying in a rotary vacuum dryer. Alternatively the stabiliser may be dissolved or dispersed in a solution or slurry of a dithionite prior to evaporation to dryness. A free flowing agent such as a sodium phosphate or a sodium salt of a condensed phosphoric acid, soda ash, sodium bicarbonate, sodium benzoate, EDTA or, preferably urea may be added if desired but will not normally be necessary.

The invention is particularly applicable in the stabilisation of sodium dithionite, but other metal dithionites, such as the potassium, calcium or zinc dithionites may be stabilised similarly. The invention is also applicable in the stabilisation of dithionite products of low strength, for example sodium dithionite products containing from 50% to 90% of $Na_2S_2O_4$.

The novel compositions may be used in general in any application in which dithionites are at present used, e.g. in vat dyeing and printing in the stripping of dyes from textiles, the reduction clearing of dyed fibres and in the bleaching of textile materials and paper pulp.

EXAMPLES

The invention is illustrated by the following examples:

In the examples the effectiveness of various stabilisers was tested by the foolowing method:

100g. of a blend of sodium dithionite and potential stabilising material in known proportions is placed in a 250 ml. Dewar flask and 7 ml. of distilled water added in 1 minute by means of a metering pump, the mixture being stirred continuously during this addition. Six thermocouples are then introduced into the Dewar to enable temperature changes in various parts of the mixture to be observed, all six thermocouples being connected to a six-point recording potentiometer. After 3 minutes a further 100 g. of the dithionite mixture is added to the flask and recording of the temperature of the mixture continued until it returns to ambient temperature.

A number of the novel stabilisers were examined by this method. (see Table I). In all cases temperature of the mixture rose over a period of about one to three hours to a value of from around 130°–140° and then gradually returned to ambient.

Details of the examples using the test method described are tabulated in Table I. The final example is included for the purposes of comparison and use an amine rather than a salt as stabiliser.

TABLE I

| STABILIZER | CONCENTRATION OF STABILIZING COMPOSITION (% wt/wt) | OBSERVED TEMP. EFFECT |
|---|---|---|
| A tallow amine acetate sold under the registered trade mark "Armac T", composed of 1, 28, 25 and 46, parts by weight of tetradecyl, hexadecyl, octadecyl and octadecenyl amines constituents respectively. | 2% | Temperature rose to 139°C. over 1¼ hours, then gradually fell to ambient value. No local ignition occurred. |
| A coconut amine acetate sold under the registered trade mark "Armac C", composed of essentially dodecyl and tetradecyl amine constituents namely 47 and 18 parts by weight respectively, the remaining amine constituents being octyl, decyl, hexadecyl, octadecyl and octadecenyl amines. | 2% | Temperature rose to 139°C. over 1 hr. 20 mins., then gradually fell to ambient value. No local ignition occurred. |
| Stearylamine acetate sold under the registered trade mark "Armac S", the Armene S base amine being composed of 20, 17, 26 and 37 parts by weight of hexadecyl, octadecyl, octadecenyl and octadecadienyl amines, respectively. | 2% | Temperature rose to 133°C. over 1 hr. 25 mins., then gradually fell to ambient value. No local ignition occurred. |
| *Stearylamine acetate sold under the registered trade | 6% | Temperature rose to 129°C over approximately 1 hr. |

TABLE I-continued

| STABILIZER | CONCENTRATION OF STABILIZING COMPOSITION (% wt/wt) | OBSERVED TEMP. EFFECT |
|---|---|---|
| mark "Armac S" | | then gradually fell to ambient value. No local ignition occurred. |
| Oleylamine acetate sold under the registered trade mark "Armac O", the Armeen O base amine being essentially octadecylamine and minor amounts of saturated and unsaturated of other higher amines. | 2% | Temperature rose to 132°C over 1 hr. 20 mins., then gradually fell to ambient value. Local ignition occurred. |
| A secondary oleylamine acetate sold under the registered trade mark "Duomac O", the Duomene O basic amine being N-oleyl-trimethylene diamine. | 2% | Temperature rose to 143°C over 1 hr. 35 mins., then gradually fell to ambient value. No local ignition occurred. |
| A secondary tallow amine acetate sold under the registered trade mark "Duomac T", the Duomene T basic amine being N-tallow-trimethylene diamine or composed of 2, 24, 28 and 46 parts by weight of tetradecyl, hexadecyl, octadecyl and octadecenyl amine constituents, respectively. | 2% | Temperature rose to 149°C over 1 hr. 25 mins., then gradually fell to ambient value. No local ignition occurred. |
| (Comparison) A secondary amine derived from a hydrogenated tallow sold under the registered trade mark "ARMEEN 2HT", a secondary high molecular weight aliphatic amine having an average composition of 24, 75 and 1, parts by weight of hexadecyl, octadecyl and octadecenyl amines, respectively, with 85 percent secondary amine. | 2% | Temperature rose to 129°C over 55 minutes, then more rapidly to 400°C, when ignition occurred. |

*Low strength sodium dithionite (60–70% $Na_2S_2O_4$), 6 ml. water addition instead of usual 7 ml.

We claim:
1. A stabilised substantially anhydrous dithionite composition comprising a major proportion of a metallic dithionite and as a stabiliser a carboxylic acid salt of a primary, secondary or tertiary amine, which amine has at least one hydrocarbon group of at least 5 carbon atoms.
2. A composition as claimed in claim 1, wherein the dithionite is sodium dithionite, potassium dithionite, calcium dithionite or zinc dithionite.
3. A composition as claimed in claim 1 wherein the amine is an alkyl amine, an aryl-, alkyaryl- or aralkyl amine.
4. A composition as claimed in claim 1 wherein the amine is an aryl-, alkyaryl- or aralkyl amine.
5. A composition as claimed in claim 1 wherein the amine includes mixed alkyl, aryl, aralkyl and/or aralkyl groups.
6. A composition as claimed in claim 1 wherein the amine is an amyl amine, cyclohexylamine, 1,3-dimethylbutylamine, hexylamine, 2-aminoheptane, 2-amino-4-methylhexane, 1,4-dimethylpentylamine, heptylamine, 2-ethylhexylamine, octylamine, 1-cyclopentyl - 2 - aminopropane, 1,1, 3,3 - tetramethyl-butylamine, decylamine, dodecylamine, tetradecylamine coco, tallow, hydrogenated tallow amine, cetylamine, stearylamine, docosylamine, cottonseed amine, oleylamine, linoleylamine, laurylamine, pamitoleylamine, margarylamine, a diamylamine, didodecylamine, ditetradecylamine, dihexadecylamine, dioctadecylamine, dicoco amine, di-hydrogenated tallow amine, di (octadecenyloctadecadienyl) amine, di (eicosyl-docosy) amine, dicyclohexylamine, bis (1,3 - dimethylbutyl) amine, bis (2 - ethyl-hexyl) amine, bis (1 - ethyl - 3- methylpentyl) amine, propylaurylamine, methyloleylamine, methyloctylamine, dioctylamine, distearylamine, a triamylamine, dimethyloctylamine, dimethyllaurylamine, dimethylstearylamine, dimethyldocosylamine, trioctylamine, tridodecylamine, tricoco amine, isooctyldicoco amine, trihydrogenated tallow amine, N - metyl - di-hydrogenated tallow amine, N,N,-dimethylhexadecylamine, N,N,-dimethyloctadecylamine, N,N,-dimethylcoco amine, N,N,-dimethyl (octadecenyl - octadecadienyl) amine, N,N - dimethyl hydrogenated tallow amine, N-octyl ethylenediamine, N-stearylpropylene diamine, N-octadecenyl trimethylenediamine, N-coco-trimethylenediamine, N-tallow-trimethylenediamine, N- (octadecenyl - octadecadienyl) trimethylenediamine, or an alkyl propylene diamine.
7. A composition as claimed in claim 1, wherein the amine gives rise to solid, water soluble carboxylate salts.
8. A composition as claimed in claim 7, wherein the amine is coco, an alkyl palmitoleyl or tallow amine.
9. A composition as claimed in claim 1, wherein the carboxylic acid is an aliphatic acid.
10. A composition as claimed in claim 1, wherein the carboxylic acid is phthalic, may be naphthenic, naphthic or acenaphtic acid.
11. A composition as claimed in claim 1, wherein the carboxylic acid is acetic, propionic, butyric, pentanoic, succinic, glutaric, adipic or oleic acid.
12. A composition as claimed in claim 1, wherein the quantity of stabiliser is within the range 0.02 to 10% by weight.
13. A composition as claimed in claim 1 wherein the quantity of stabiliser is in the range 0.5, to 3%.
14. A composition claimed in claim 12 wherein the quantity of stabiliser is in the range 1 to 2%.
15. A composition as claimed in claim 1 wherein the quantity of dithionite is at least 90% of the composition by weight.
16. A composition as claimed in claim 1, including a free flowing agent.
17. A method of forming a stabilised substantially anhydrous metallic dithionite composition which comprises intimately mixing the dithionite with a carboxylic acid salt of a primary, secondary or tertiary amine having at least one hydrocarbon group of at least 5 carbon atoms.
18. A method as claimed in claim 17 wherein the salt to be mixed with the dithionite is in the form of a melt.
19. A method as claimed in claim 17 wherein the dithionite is in solution in an organic solvent which is removed when the mixing is complete.
20. A method of forming a stabilised substantially anhydrous dithionite composition which comprises adding to the reaction mixture for forming the dithionite a carboxylic acid salt of a primary, secondary or tertiary amine having at least one hydrocarbon group of at least

5 carbon atoms, the salt being added during the last stages of dithionite manufacture.

21. A method as claimed in claim 20, wherein an alcoholic filter cake of the dithionite is mixed with an alcoholic solution of the salt prior to drying of the filter cake.

22. A method as claimed in claim 20, wherein the salt is dissolved or dispersed in a solution or slurry of the dithionite prior to evaporation to dryness.

* * * * *